United States Patent
Nakagawa

(10) Patent No.: US 8,465,682 B2
(45) Date of Patent: Jun. 18, 2013

(54) SEMICONDUCTIVE RUBBER BELT, AND PROCESS FOR PRODUCING THE SAME

(75) Inventor: Takahiro Nakagawa, Osaka (JP)

(73) Assignee: Toyo Tire & Rubber Co., Ltd., Osaka-shi (JP)

( * ) Notice: Subject to any disclaimer, the term of this patent is extended or adjusted under 35 U.S.C. 154(b) by 0 days.

(21) Appl. No.: 13/614,950

(22) Filed: Sep. 13, 2012

(65) Prior Publication Data

US 2013/0009334 A1  Jan. 10, 2013

Related U.S. Application Data

(62) Division of application No. 12/721,453, filed on Mar. 10, 2010, now Pat. No. 8,293,351.

(30) Foreign Application Priority Data

Mar. 12, 2009  (JP) ................................. 2009-059908

(51) Int. Cl.
*C04B 35/00* (2006.01)

(52) U.S. Cl.
USPC ............................ 264/104; 264/464; 264/477

(58) Field of Classification Search
USPC ......................................... 264/104, 464, 477
See application file for complete search history.

(56) References Cited

U.S. PATENT DOCUMENTS

| | | | |
|---|---|---|---|
| 5,631,725 | A | 5/1997 | Harasawa et al. |
| 2009/0052954 | A1 | 2/2009 | Kashiwabara et al. |

FOREIGN PATENT DOCUMENTS

| | | |
|---|---|---|
| JP | 30556413 B2 | 9/1997 |
| JP | 3998344 B2 | 4/2000 |
| JP | 3414514 B2 | 4/2003 |

*Primary Examiner* — Michael C Miggins
(74) *Attorney, Agent, or Firm* — Alleman Hall McCoy Russell & Tuttle, LLP

(57) ABSTRACT

An object of the present invention is to provide a semiconductive rubber belt wherein a variation in the electric resistance is decreased, in particular, in the belt circumferential direction so that high-quality images can be formed, and a process for producing the same. In order to achieve the object, in a case where on any single straight line extended in the belt circumferential direction, the maximum value of the molecular orientation ratio correction value MOR-C of the semiconductive rubber belt, the minimum value thereof, and the average thereof are set to satisfy a specified relationship.

2 Claims, 2 Drawing Sheets

SEMICONDUCTIVE RUBBER BELT, AND PROCESS FOR PRODUCING THE SAME

This present application is a divisional of U.S. patent application Ser. No. 12/721,453 filed Mar. 10, 2010, entitled "SEMICONDUCTIVE RUBBER BELT, AND PROCESS FOR PRODUCING THE SAME," naming Takahiro Nakagawa as inventor, which in turn claims priority to JP2009-059908 filed Mar. 12, 2009, the entire contents of which are incorporated herein by reference.

BACKGROUND OF THE INVENTION

1. Field of the Invention

The present invention relates to a semiconductive rubber belt used in a transferring section or the like in an image forming apparatus based on electrostatic photography, such as a copying machine, a printer, or a facsimile machine; and a process for producing the same.

2. Description of Related Art

The semiconductive rubber belt used in a transferring section or the like in an image forming apparatus is generally a belt containing a conductive filler, such as graphite or carbon black, and having a volume resistivity adjusted to the range of $10^4$ to $10^{12}$ ohm-centimeters ($\Omega$cm). The range of the volume resistivity is generally in the so-called semiconductive range. In this range, the electric resistance of the semiconductive rubber belt tends to vary in accordance with a slight variation in the amount of the filler that is added to the belt. Then the electric resistance of the rubber belt is varied, formed images may become uneven. Thus, it is very important to make the electric resistance of the semiconductive rubber belt even as a whole. A process that is known for producing this semiconductive rubber belt, is the "tube extrusion molding process", wherein an unvulcanized rubber composition into which a filler is blended is subjected to tube extrusion molding to form a tubular unvulcanized rubber belt molded body; this body is allowed so cover a mold, and then the body is heated to be vulcanized, thereby yielding the belt.

In the tube extrusion molding process, the flowing rate (extrusion rate) of the unvulcanized rubber composition, into which the filler is blended, can also be set to a low value; therefore, a shearing force that is received by the unvulcanized rubber composition can be made relatively small when the composition passes through the cap or the like of the extruder. However, when an attempt is made for making the electric resistance of the semiconductor rubber belt even in the semiconductive range, the electric resistance of the belt may be locally varied even by a slight shearing hysteresis at the time of the extrusion molding. In particular, in bridge moieties, the number of which is usually three or more, located in a die (cap) necessary for extruding the unvulcanized rubber composition into a tubular form, weld lines of the unvulcanized rubber itself are generated in the width direction of the belt (the extrusion direction of the belt). In the moieties, the thickness of the belt is made small, and further a variation in the electric resistance may be generated. Accordingly, ordinary manners of the tube extrusion molding process have a problem that weld lines are formed at intervals in the "belt circumferential direction" orthogonal to the width direction of the belt so that the electric resistance of the resultant semiconductive rubber belt is varied in the belt circumferential direction.

Japanese Patent No. 3414514 described below discloses an image forming apparatus wherein the control of the intensity of transferring bias makes it possible to keep the charge amount of its semiconductive rubber belt constant even when a change is caused in the electric resistance of the semiconductive rubber belt in the belt circumferential direction (that is, even when the electric resistance of the semiconductive rubber belt is varied in the belt circumferential direction). However, the apparatus described in this document needs a separate device for controlling the intensity of the transferring bias. When the rotating speed of the semiconductive rubber belt is made high to heighten the image formation processing speed of the image forming apparatus, the intensity of the transferring bias is not easily controlled. Accordingly, in the market, it is largely desired to make the electric resistance of any semiconductive rubber belt even at a high level.

Japanese Patent No. 3056413 described below describes a semiconductive belt in which on any single line along the width direction of the belt, the average of the molecular orientation angle θ to the belt width direction is set into the range of −15 to +15° and further the relationship between the average of the molecular orientation ratio correction value MOR-C of its conductive layer, the maximum value thereof, and the minimum value thereof is set to satisfy an expression of (the maximum value−the minimum value)/the average<0.4, whereby a variation in the electric resistance of the belt in the width direction thereof is decreased so that images to be formed can be prevented from becoming uneven. However, this semiconductive rubber belt cannot solve the problem that the electric resistance is varied in the belt circumferential direction since the belt is produced in an ordinary manner of tube extrusion molding process.

Japanese Patent. No. 3998344 described below discloses that according to the process for producing a semiconductive rubber belt using an extruder equipped with a crosshead having an inner cylinder section in which a spiral flow type groove is made, it is possible to produce a semiconductive rubber belt wherein the generation of a variation in the electric resistance is decreased. However, the present inventors have made investigations so as to make it evident that about semiconductive rubber belts produced by this producing process, there is a room for a further improvement, in particular, with respect to a variation in the electric resistance in the belt circumferential direction.

Patent Document 1: Japanese Patent Publication No. 3414514

Patent Document 2: Japanese Patent. Publication No. 3056413

Patent Document 3: Japanese Patent Publication No. 3998344

SUMMARY OF THE INVENTION

In light of the above-mentioned situation, the invention has been made, and an object thereof is to provide a semiconductive rubber belt wherein a variation in the electric resistance is decreased, in particular, in the belt circumferential direction so that high-quality images can be formed, and a process for producing the same.

In order to solve the problems, the present inventors have made investigations about the relationship between the molecular orientation ratio correction value MOR-C of a semiconductive rubber belt in the belt circumferential direction and the image quality of images to be formed. As a result, the inventors have found out that in a case where on any single straight line extended in the belt circumferential direction, the maximum value of the molecular orientation ratio correction value MOP-C of the semiconductive rubber belt, the minimum value thereof, and the average thereof are set to satisfy a specified relationship, the problems can be solved.

That is, the present invention is directed to a seamless semiconductive rubber be having a volume resistivity of $10^4$ to $10^{12}$ Ωcm, wherein about the molecular orientation ratio correction value MOR-C of the semiconductive rubber belt on any single straight line extended in the belt circumferential direction orthogonal to the width direction of the belt, the molecular orientation ratio correction value being represented by the following expression (1):

$$MOR\text{-}C = ((t_c \times (MOR-1)/t_s) + 1 \qquad (1)$$

wherein MOR represents the molecular orientation ratio, $t_c$ represents the correction thickness (millimeters, mm), and $t_s$ represents the thickness (mm) of the belt, the following expressions (2) and (3) are satisfied:

$$(a-b)/c < 0.64 \qquad (2), \text{ and}$$

$$a/b < 1.87 \qquad (3)$$

wherein a represents the maximum value of the molecular orientation ratio correction value MOR-C, b represents the minimum thereof, and c represents the average.

In the semiconductive rubber belt, an unevenness in the molecular orientation ratio correction value is decreased in the belt circumferential direction; thus, a variation in the electric resistance is decreased, in particular, in the belt circumferential direction. For this reason, the image quality of images to be formed can be made high, and further the electric resistance of the semiconductive rubber belt can be made even at a high level, so that the rotating speed of this belt can be made high without requiring an especial new device or the like. As a result, in a high-speed copying machine, a printer or any other image forming apparatus that has the semiconductive rubber belt, a high image quality and a high carrying stability can be certainly kept without using any special, new device.

The present invention is directed to a process for producing a seamless semiconductive rubber belt having a volume resistivity of $10^4$ to $10^{12}$ Ωcm, comprising:

an extruding step of using an extruder equipped with a crosshead having an inner cylinder section wherein a spiral flow type groove is made to plasticize an unvulcanized rubber composition having a scorch time $t_5$ of 10 to 18 minutes, and extruding the composition through the extruder, an unvulcanized rubber belt molding step of shifting, inside the inner cylinder section, a cylindrical mold in a direction substantially orthogonal to the extrusion direction of the unvulcanized rubber composition in the extruder while making the unvulcanized rubber composition into a layer form and allowing the layer-form unvulcanized rubber composition to cover the outside surface of the cylindrical mold, thereby yielding an unvulcanized rubber belt molded body, and a vulcanizing step of vulcanizing the unvulcanized rubber belt molded body, thereby yielding the semiconductive rubber belt.

By using an extruder equipped with a crosshead having an inner cylinder section wherein a spiral flow type groove is made to extrude an unvulcanized rubber composition having a scorch time $t_5$ of 10 to 18 minutes in a specified molding manner, a semiconductive rubber belt wherein an unevenness in the molecular orientation ratio correction value is decreased in the belt circumferential direction can be produced. More specifically, according to the process for producing a semiconductive rubber belt, a semiconductive rubber belt satisfying the above expressions (2) and (3) can be produced.

In the process for producing a semiconductive rubber belt, it is preferred that the ratio between the maximum outside diameter d of the inner cylinder section and the outside diameter e of a discharging opening in the section (the die contraction ratio) satisfies the following: $0.2 \leq e/d \leq 0.8$, and further the shift speed of the cylindrical mold is 1 meter per minute or less in the unvulcanized rubber belt molding step. This producing process makes it possible to produce a semiconductive rubber belt wherein an unevenness in the molecular orientation ratio correction value is certainly decreased in the belt circumferential direction, and the electric resistance is made even at a high level.

DETAILED DESCRIPTION OF THE PREFERRED EMBODIMENTS

Figure 1:
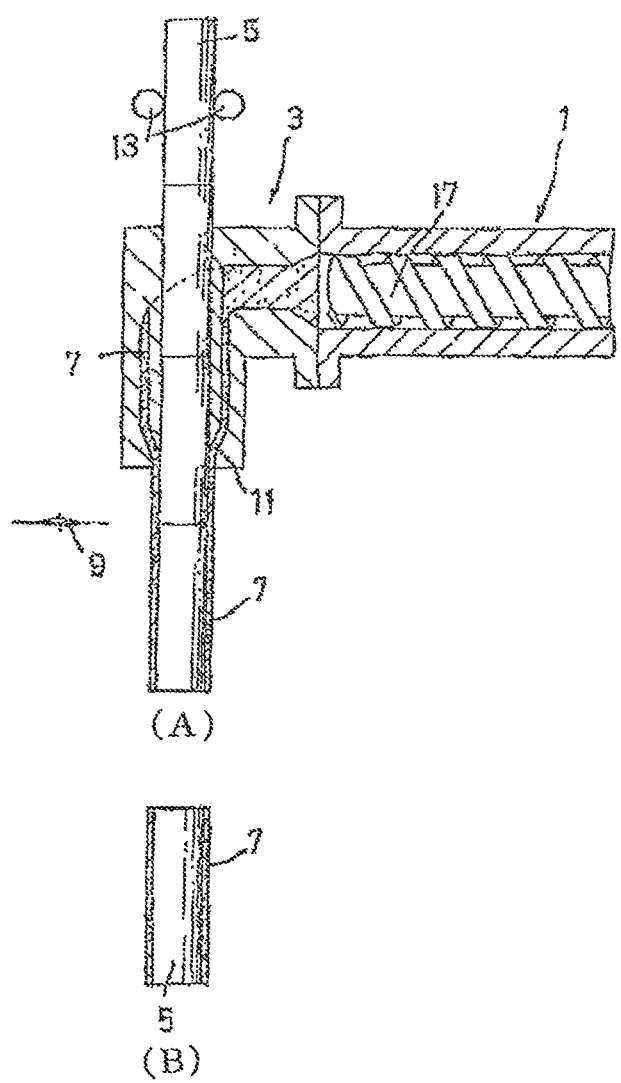
FIGS. 1A and 1B are each a view which schematically illustrates an example of an apparatus for producing a semiconductive rubber belt.

The extruder used in the present invention may be a known rubber extruder, and is preferably an extruder having a vacuum system for removing air bubbles generated in the belt in a vulcanizing step, or the like.

The semiconductive rubber belt of the present invention has a rubber substrate layer. As a rubber material which constitutes the rubber substrate layer, a known rubber material may be used without any especial restriction. Examples thereof include natural rubber (NR); diene rubbers such as styrene butadiene rubber (SBR), isoprene rubber (IR), butadiene rubber (BR), chloroprene rubber (CR), and nitrile rubber (acrylonitrile-butadiene rubber: NBR); non-diene synthetic rubbers such as ethylene-propylene rubbers (EPM, and EPDM), butyl rubber (IIR), acrylic rubbers (ACM, and ANM), and epichlorohydrin rubbers (CO, and ECU); other rubbers such as urethane rubber (U), fluorine-contained rubber (FKM), silicone rubber (Q), and polysulfide rubber (T). These may be used alone or in combination of two or more thereof. It is preferred to use, out of the rubber materials, a rubber material containing at least one of CR, EPDM, NBR, and CO (ECO).

In order to give semiconductivity to the belt in the present invention, a filler is used. As the filler, carbon black is preferably used. Specific examples thereof include EC (Extra Conductive) carbon, ECF (Extra Conductive Furnace) carbon, SCF (Super Conductive Furnace) carbon, CF (Conductive Furnace) carbon, acetylene black, and other carbon blacks such as SAF, ISAF, HAF, FEF, GPF, SRF, FT, and MT. These may be used alone or in combination of two or more thereof.

Together with carbon black, other conductivity giving agents may be used if necessary, examples of the agent including metallic materials, such as silver powders, copper powders, and nickel powders; metal oxides such as tin oxide and indium oxide; inorganic materials such as mica coated with metal; and carbon materials such as graphite and carbon fiber.

To the rubber material are added not only the filler for giving conductivity but also well-known additives for rubber, such as a process oil, a plasticizer, a stabilizer, and a dispersion improver, and the mixture is kneaded. Thereto are further added additives such as a vulcanizing agent, a vulcanization accelerator, and a crosslinkage density adjustor to prepare an unvulcanized rubber composition. The composition is supplied to an extruder. The crosslinkage may be based on the addition of a peroxide, sulfur vulcanization, or any other well-known vulcanizing manner.

In the process for producing a semiconductive rubber belt according to the present invention, it is important to use an unvulcanized rubber composition having a scorch time $t_s$ of 10 to 18 minutes, which is obtained by blending the rubber material, the filler and the various additives. By using an extruder having an inner cylinder section wherein a spiral flow type groove is made to extrude the unvulcanized rubber composition in the specified molding manner, an unevenness in the molecular orientation ratio correction value can be decreased in the belt circumferential direction. The unvulcanized rubber composition having a scorch time $t_s$ of 10 to 18 minutes is obtained by adjusting appropriately the blend ratios of, in particular, the vulcanizing agent and the vulcanization accelerator, out of the above-mentioned additives, to the rubber material, or adjusting appropriately a discharging temperature when the rubber is kneaded, or the storage temperature of the unvulcanized rubber composition.

The following will describe the process for producing a semiconductive rubber belt according to the present invention. An example of an apparatus used to carry out the invention is illustrated in FIG. 1. The apparatus, for producing an unvulcanized rubber belt molded body, used in the process for producing a semiconductive rubber belt according to the present invention is composed of an extruder 1, a crosshead 3 fitted to the extrusion forefront thereof, and cylindrical molds 5. An unvulcanized rubber composition supplied from a hopper (not illustrated) is heated and plasticized, and then fed to the crosshead 3, which is fitted to the forefront, by means of a screw 17. The cylindrical molds 5 are sent at a constant speed from one end of the crosshead 3 to a direction substantially orthogonal to the rubber extruding direction by means of a driving member 13. In the unvulcanized rubber belt molding step, the shift speed of the cylindrical molds 5 is preferably 1 meter per minute or less. When the shift speed of the cylindrical molds 5 is in this range, an unevenness in the molecular orientation ratio correction value is certainly decreased in the belt, circumferential direction, so that a semiconductive rubber belt having an electric resistance made even as a high level can be produced.

Inside the crosshead 3, the flow direction of the unvulcanized rubber composition extruded from the extruder 1 is changed to the shift direction of the cylindrical molds 5, and further the composition is allowed to flow in a cylindrical form so as to cover the cylindrical molds 5. Through a thickness adjustor 11, the composition is made into a predetermined thickness and allowed to cover the outside surfaces of the cylindrical molds 5.

As illustrated in FIG. 1, preferably, the cylindrical molds 5 are continuously shifted. In the case, the covering layer of the unvulcanized rubber composition is continuous. Seams of the continued cylindrical molds 5 are detected by an appropriate means, and then the unvulcanized rubber composition layer is cut by a cutter 9. The molds are separated from each other in a state where the molds each have the unvulcanized rubber molded body layer. The separated molds are supplied to a vulcanizing step.

In the example illustrated in FIG. 1, the driving means 13 for shifting the cylindrical molds 5 is a means wherein two rollers are used. However, the means is not limited thereto.

As a vulcanizing method used in the vulcanizing step, any known vulcanizing method may be used without any limitation. Specific examples of the method include a method using a vulcanizing can, a method of heating the molds with vapor, an electric heater or the like, an oven vulcanization method of heating the unvulcanized rubber belt molded bodies in a heating oven under normal pressure, a method of blowing a heat medium such as heated water vapor toward the molds to expand the rubber membranes (bladders), thereby pressuring the unvulcanized rubber belt molded bodies to vulcanize the molded bodies (bladder vulcanization method), and a vulcanizing method using a high energy radial ray such as an electron beam. A vulcanizing method wherein two or more of these methods are combined with each other may be used.

Figure 2:
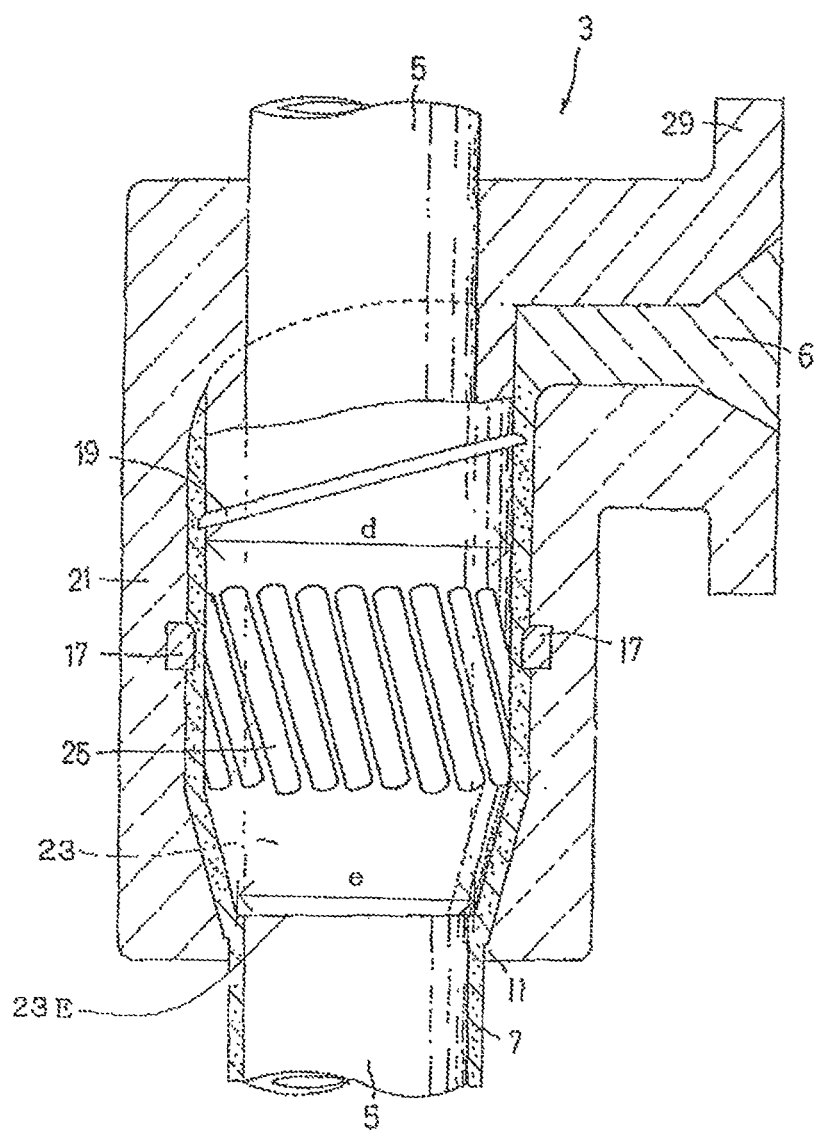
FIG. 2 is a view which illustrates an example of the structure of a crosshead.

A specific example of the structure of the crosshead 3 is illustrated in FIG. 2. The crosshead 3 has an axial center in a direction substantially orthogonal to the direction along which an unvulcanized rubber composition 6 is extruded from the extruder 1. The crosshead 3 has an outer cylinder section 21 and an inner cylinder section 23, and fitted to the forefront of the extruder through a flange 29. Between the outer cylinder section 21 and the inner cylinder section 23, a cylindrical space is formed. The unvulcanized rubber composition extruded out from the extruder 1 is molded into a cylindrical form in this space, and then pushed into the forefront. The outer cylinder section 21 has, near its central region, a flow adjusting ring 17, and has, at its forefront, a thickness adjustor 11. Inside the inner cylinder section 23, the cylindrical molds 5 can be shifted, and the section 23 has an edge ring 19 and a spiral flow type groove 25 for adjusting the flow and making the flow even. The cylindrical molds 5 are inserted from one end of the crosshead into one end of the inner cylinder section 23, and then shifted at a constant speed. At the other end of the inner cylinder section 23, the cylindrical unvulcanized rubber composition is made into a predetermined thickness by means of the thickness adjustor 11 and allowed to cover the outside surface of each of the cylindrical molds 5. In this way, an unvulcanized rubber belt molded body 7 is formed. The thickness adjustor 11 is preferably formed in such a manner that the adjustor 11 can be attached to the outer cylinder section 21 and removed therefrom in order that the adjustor 11 can be exchanged to produce belts having different thicknesses.

The inner cylinder section 23 of the crosshead 3 in the present embodiment has a maximum outside diameter at the upstream side thereof relative to the spiral flow type groove 25 (at the extruder side thereof), and has a minimum outside diameter at the forefront side thereof (at a discharge opening 23E side thereof). In the embodiment, the ratio between the maximum outside diameter d of the inner cylinder section 23 and the outside diameter e of the discharging opening (the die contraction ratio) is set to satisfy the following $0.2 \leq e/d \leq 0.8$. When this die contraction ratio is set into the range, an unevenness in the molecular orientation ratio correction value is certainly decreased in the belt circumferential direction so that a semiconductive rubber belt having an electric resistance made even at a high level can be produced.

The process for producing a semiconductive rubber belt according to the present invention may have a polishing step of polishing the rubber substrate layer of the semiconductive rubber belt yielded in the vulcanizing step into a predetermined thickness. In the polishing apparatus that can be used in the polishing step, a known belt polishing means may be used without any limitation. An example thereof is an apparatus in which while a mandrel or a plurality of rollers are used to rotate the belt in a belt-stretched state, the belt is polished with a polishing means such as a rotary grindstone. The thickness of the rubber substrate layer after the polishing is not particularly limited, and is, for example, from 400 to 700 micrometers (μm).

In the semiconductive rubber belt according to the present invention, the volume resistivity thereof can be set into the range of $10^4$ to $10^{12}$ Ωcm, in particular, by adjusting the blend ratio between the rubber material and the filler appropriately. In order to decrease an unevenness in the molecular orientation ratio correction value in the belt circumferential direction and to decrease a variation in the electric resistance thereof in the belt circumferential direction, it is important that the molecular orientation ratio correction value MOR-C of the semiconductive rubber belt on any single straight line extended in the belt circumferential direction orthogonal to the width direction of the belt is represented by the following expression (1):

$$MOR\text{-}C = ((t_c \times (MOR-1)/t_s) + 1 \quad (1)$$

wherein MOR represents the molecular orientation ratio, $t_c$ represents the correction thickness (mm), and $t_s$ represents the thickness (mm) of the belt, the following expressions (1) and (2) are satisfied:

$$(a-b)/c < 0.64 \quad (2), \text{ and}$$

$$a/b < 1.87 \quad (3)$$

wherein a represents the maximum value of the molecular orientation ratio correction value MOR-C, b represents the minimum thereof, and c represents the average. According to the process for producing a semiconductive rubber belt according to the invention, a semiconductive rubber belt satisfying the expressions (2) and (3) can be produced.

In order to attain a further decrease in an unevenness in the molecular orientation ratio correction value of the semiconductive rubber belt according to the present invention in the nets circumferential direction and to decrease, in particular, a variation in the electric resistance thereof in the belt circumferential direction, the following expressions (2)' and (3)' are satisfied on any single straight line extended in the belt circumferential direction orthogonal to the width direction of the belt.

$$(a-b)/c < 0.50 \quad (2)', \text{ and}$$

$$a/b < 1.71 \quad (3)'$$

In the semiconductive rubber belt of the present invention, a releasing layer may be appropriately formed on a belt surface of the rubber substrate layer if desired. The releasing layer may be formed on one side or both sides of the belt surface. The thickness of this releasing layer is not particularly limited, and is, for example, from 3 to 20 μm.

The material which forms the releasing layer is preferably a material from which toner is easily exfoliated, and is preferably a painted film layer obtained by painting. The paint used therefor may be selected, considering the adhesive property onto the belt substrate layer, the toner-exfoliating performance, the electric characteristics thereof, and the like. The paint is preferably a polyurethane based paint, and is in particular preferably a paint to which polytetrafluoroethylene fine particles are added, considering the abrasion resistance of the painted film layer, the adhesive property onto the rubber substrate layer, and the flexibility.

EXAMPLES

Hereinafter, examples or the like for specifically demonstrating the structure and effects of the present invention will be described. The molecular orientation ratio correction value MOR-C of any semiconductive rubber belt was calculated by measuring the molecular orientation ratio MOR thereof with a molecular orientation meter (model number: MOA-6015) manufactured by Oji Scientific Instruments, and then substituting the measured molecular orientation ratio MOR into the expression (1). When a thickness correction of the molecular orientation ratio correction value MOR-C was made, the correction thickness $t_c$ in the expression (1) was set to 1.08 mm. In the measurement of the molecular orientation ratio correction value MOR-C of any semiconductive rubber belt, molecular orientation ratio correction value MOR-C values were measured at 3 to 6 points on each of a first line to a $n^{th}$ line wherein n is from 2 to 5, the lines being extended in the belt circumferential direction of the semiconductive rubber belt, and then the average thereof was calculated about each of the lines.

Materials used in the examples, trade names thereof, and supplying makers thereof are shown in Table 1.

(Preparation of Rubber Compositions)

To 100 parts by weight of a rubber component were added components except sulfur and a vulcanization accelerator in accordance with each blend formulation shown in Table 1, and then the mixed components were kneaded by a kneader. The composition was cooled, and then the components together with sulfur and the vulcanization accelerator in the formulation were kneaded again by the kneader to prepare an unvulcanized rubber composition in a ribbon form. The composition was supplied to an extruder. The scorch time $t_5$ of each of the used unvulcanized rubber compositions is shown in Table 1.

The extruder to be used was a vent type extruder having a screw diameter of 50 mm. To this extruder was fitted each crosshead capable of sending cylindrical molds each having an outside diameter of 30 to 150 mm and a length of 400 mm continuously (Table 1 shows the maximum outside diameter d, the discharging opening outside diameter e, and the ratio e/d therebetween (die contraction ratio) of each of the crosshead inner cylinder sections to be used). In the extruder, the screw temperature and the cylinder temperature were adjusted in the range of 50 to 60° C., and the crosshead temperature was adjusted in the range of 70 to 90° C. The cylindrical molds were supplied in a direction orthogonal to the screw at each shift speed described in Table 1 to allow an unvulcanized rubber belt molded body having a thickness of 0.9 mm to cover the periphery of each of the molds. The cylindrical molds covered with the unvulcanized rubber belt layer were automatically discharged from the crosshead by the extrusion of the rubber, and the flowing pressure.

The cylindrical molds, which were each covered with the unvulcanized rubber belt molded body yielded in the extruding step, were put into a vulcanizing vapor can, the temperature of which was set so 175° C. The can was then heated for 15 minutes to vulcanize the molded bodies. After the vulcanization, the front surface and the rear surface of one of the belts taken out from the cylindrical molds were polished by a thickness of 0.2 mm (total polished thickness: 0.4 mm) to yield a rubber belt (rubber substrate layer) having a thickness of 0.5 mm. Furthermore, both side end regions thereof were cut to yield a belt having a width of 350 mm. About the molecular orientation ratio correction value MOR-C of the resultant semiconductive rubber belt, the value of [(a−b)/c] and that of [a/b] are shown in Table 2, wherein a represents the maximum value of the MOR-C, b represents the minimum value thereof and c represents the average. The volume resistivity of the resultant semiconductive rubber belt was measured in 3 to 6 points along the belt circumferential direction at an applied voltage of 500 V, and the average of the resultant values was calculated. The results are shown in Table 2.

Examples 1 to 4, and Comparative Example 1

The semiconductive rubber belts produced under the blending and conditions shown in Table 1 were each fitted to an image forming apparatus. About the belts, actual-machine tests were made, and then the belts were evaluated by observing the image quality of formed images with the naked eye. In Table 2, ○ represents a level at which the image quality was high so that no problem was caused; Δ represents a level at which the formed images partially had transfer unevenness but no problem was caused; and x represents a level at which the formed images had transfer unevenness in a considerable amount so that the belt, was unable to be practically used.

TABLE 1

| | | | Examples 1 | Examples 2 | Examples 3 | Examples 4 | Comparative Example 1 |
|---|---|---|---|---|---|---|---|
| | | | Blending | | | | |
| Material names | Trade names | Supplying maker names | phr | phr | phr | phr | phr |
| CR | SHOWPRENE WRT | Showa Denko K. K. | 80 | 80 | 80 | 80 | 80 |
| EPDM | ESPRENE 505 | Sumitomo Chemical Co., Ltd. | 20 | 20 | 20 | 20 | 20 |
| Carbon | DENKA BLACK | Denki Kagaku Kogyo Kabushiki Kaisha | 20 | 20 | 17 | 22 | 17 |
| Zinc Oxide | Zinc White #1 | Mitsui Mining & Smelting Co., Ltd. | 5 | 5 | 5 | 5 | 5 |
| Magnesium oxide | KYOWA MAG #150 | Kyowa chemical Industry Co., Ltd. | 4 | 4 | 4 | 4 | 4 |
| Stearic acid | LUNACK S-40 | Kao Corporation | 2 | 2 | 2 | 2 | 2 |
| Naphthene based oil | PROCESS OIL NS-24 | Idemitsu Kosan Co., Ltd. | 10 | 10 | 10 | 10 | 10 |
| Sulfur | SULFUR | Hosoi Chemical Industry Co., Ltd. | 2 | 0.5 | 0.5 | 2 | 0.5 |
| Trimethylthiourea | VULCANIZATION ACCELERATOR: NOCKCELLER TMU | Ouchi-Shinko Chemical Industrial Co., Ltd. | 1 | — | 1 | 1 | 1 |
| Tetramethylthiuramdisulfide | VULCANIZATION ACCELERATOR: NOCKCELLER TT | Ouchi-Shinko Chemical Industrial Co., Ltd. | 0.5 | 0.5 | 0.5 | 0.5 | 0.5 |
| Di-o-tolylguanidine | VULCANIZATION ACCELERATOR: NOCKCELLER DT | Ouchi-Shinko Chemical Industrial Co., Ltd. | 1 | — | 1 | 1 | 1 |
| Zinc dimethyldithiocarbamate | VULCANIZATION ACCELERATOR: NOCKCELLER PZ | Ouchi-Shinko Chemical Industrial Co., Ltd. | 0.2 | — | — | — | — |
| Zinc diethyldithiocarbamate | VULCANIZATION ACCELERATOR: ACCEL EZ | Kawaguchi Chemical Industry Co., Ltd. | 0.5 | — | — | — | — |
| Ethylenethiourea | VULCANIZATION ACCELERATOR: ACCEL 22 | Kawaguchi Chemical Industry Co., Ltd. | — | 0.5 | — | — | — |
| Diphenylguanidine | VULCANIZATION ACCELERATOR: ACCEL D | Kawaguchi Chemical Industry Co., Ltd. | — | 0.3 | — | — | — |
| Scorch time ($t_5$) | | | 11.3 | 14.5 | 16.6 | 11.4 | 18.6 |
| | | Producing conditions | | | | | |
| Maximum outside diameter d (mm) of inner cylinder section | | | 224.0 | 144.0 | 144.0 | 144.0 | 144.0 |
| Discharging opening outside diameter e (mm) | | | 139.4 | 103.9 | 96.4 | 40.8 | 96.4 |
| Contraction ratio e/d | | | 0.622 | 0.722 | 0.669 | 0.283 | 0.669 |
| Shift speed (m/minute) of cylindrical molds | | | 0.96 | 0.43 | 0.88 | 0.42 | 1.07 |
| Discharging temperature at the time of rubber-kneading (first kneading) (° C.) | | | 120 | 120 | 120 | 120 | 110 |

TABLE 2

| | | MOR-C | | | Volume resistivity | Image quality evaluation |
|---|---|---|---|---|---|---|
| | | C | (a − b)/c | a/b | | |
| Examples 1 | First line | 10.4 | 0.291 | 1.330 | 5.02E+06 | ○ |
| | Second line | 10.4 | 0.270 | 1.300 | 5.37E+06 | ○ |
| | Third line | 10.3 | 0.232 | 1.257 | 5.87E+06 | ○ |
| | Forth line | 10.4 | 0.249 | 1.279 | 5.50E+06 | ○ |
| Examples 2 | First line | 15.7 | 0.552 | 1.712 | 4.36E+06 | Δ |
| | Second line | 15.4 | 0.512 | 1.622 | 4.41E+06 | Δ |
| | Third line | 15.9 | 0.484 | 1.586 | 4.15E+06 | ○ |
| | Forth line | 15.7 | 0.486 | 1.590 | 4.60E+06 | ○ |
| | Fifth line | 15.8 | 0.424 | 1.506 | 4.61E+06 | ○ |
| Examples 3 | First line | 17.4 | 0.580 | 1.758 | 5.32E+09 | Δ |
| | Second line | 17.0 | 0.496 | 1.643 | 5.18E+09 | ○ |
| Examples 4 | First line | 13.5 | 0.075 | 1.078 | 4.21E+06 | ○ |
| | Second line | 13.8 | 0.073 | 1.075 | 4.29E+06 | ○ |
| | Third line | 13.6 | 0.089 | 1.094 | 4.03E+06 | ○ |
| | Forth line | 13.2 | 0.042 | 1.043 | 3.95E+06 | ○ |
| | Fifth line | 13.1 | 0.037 | 1.037 | 4.32E+06 | ○ |
| Comparative Example 1 | First line | 15.5 | 0.715 | 2.048 | 3.74E+09 | X |
| | Second line | 15.3 | 0.762 | 2.135 | 3.63E+09 | X |

From Table 2, it is understood that according to the actual tests and evaluation of the semiconductive rubber belts of Examples 1 to 4, high-quality images can be formed, while according to the actual tests and evaluation of the semiconductive rubber belt of Comparative Example 1, transfer unevenness is generated in a large amount so that the belt is unable to be practically used.

What is claimed is:

1. A process for producing a seamless semiconductive rubber belt having a volume resistivity of $10^4$ to $10^{12}$ Ωcm, comprising:
    an extruding step of using an extruder equipped with a crosshead having an inner cylinder section wherein a spiral flow type groove is made to plasticize an unvulcanized rubber composition having a scorch time $t_5$ of 10 to 18 minutes, and extruding the composition through the extruder,
    an unvulcanized rubber belt molding step of shifting, inside the inner cylinder section, a cylindrical mold in a direction substantially orthogonal to the extrusion direction of the unvulcanized rubber composition in the extruder while making the unvulcanized rubber composition into a layer form and allowing the layer-form unvulcanized rubber composition to cover the outside surface of the cylindrical mold, thereby yielding an unvulcanized rubber belt, molded body, and
    a vulcanizing step of vulcanizing the unvulcanized rubber belt molded body, thereby yielding the semiconductive rubber belt.

2. The process for producing the semiconductive rubber belt according to claim 1, wherein the ratio between the maximum outside diameter d of the inner cylinder section and the outside diameter e of a discharging opening in the section (the die contraction ratio) satisfies the following: $0.2 \leq e/d \leq 0.8$, and further the shift speed of the cylindrical mold is 1 m/minute or less in the unvulcanized rubber belt molding step.

* * * * *

UNITED STATES PATENT AND TRADEMARK OFFICE
CERTIFICATE OF CORRECTION

PATENT NO. : 8,465,682 B2  
APPLICATION NO. : 13/614950  
DATED : June 18, 2013  
INVENTOR(S) : Takahiro Nakagawa Page 1 of 1

It is certified that error appears in the above-identified patent and that said Letters Patent is hereby corrected as shown below:

In the Claims:

At Column 12, line 26, delete ",".

Signed and Sealed this  
Twenty-ninth Day of October, 2013

Teresa Stanek Rea  
*Deputy Director of the United States Patent and Trademark Office*